(12) United States Patent
Liu

(10) Patent No.: US 7,412,373 B2
(45) Date of Patent: Aug. 12, 2008

(54) CHANNEL EMULATING DEVICE

(75) Inventor: I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 195 days.

(21) Appl. No.: 11/296,363

(22) Filed: Dec. 8, 2005

(65) Prior Publication Data

US 2007/0136046 A1 Jun. 14, 2007

(51) Int. Cl.
*G06F 9/455* (2006.01)
(52) U.S. Cl. .............................. 703/27; 703/2; 455/423
(58) Field of Classification Search .................... 703/2, 703/27; 455/67.11, 67.14, 423
See application file for complete search history.

(56) References Cited

U.S. PATENT DOCUMENTS

| | | | | |
|---|---|---|---|---|
| 7,206,549 | B2 * | 4/2007 | Lin et al. .................. | 455/67.11 |
| 2006/0229018 | A1 * | 10/2006 | Mlinarsky et al. ......... | 455/67.11 |
| 2006/0229019 | A1 * | 10/2006 | Mlinarsky ................ | 455/67.11 |
| 2006/0229020 | A1 * | 10/2006 | Mlinarsky et al. ......... | 455/67.14 |
| 2006/0252419 | A1 * | 11/2006 | Liu ............................ | 455/423 |

OTHER PUBLICATIONS

Caunegre et al., P. Achieving Simulation-Based Test Program Verification and Fault Simulation Capabilities for Mixed-Signal Systems, Proceedings of the 1995 European Conference on Design and Test EDTC '95, Mar. 1995, pp. 469-477.*
Parthasarathy et al., K. Bist and Production Testing of ADCs Using Imprecise Stimulus, ACM Transactions on Design Automation of Electronic Systems, Oct. 2003, pp. 522-545.*
Grochowski et al., A. Integrated Circuit Testing for Quality Assurance in Manufacturing: History, Current Status, and Future Trends, IEEE Transactions on Circuits and Systems—Analog and Digital Signal Processing, vol. 44, No. 8, Aug. 1997, pp. 610-633.*
Henley, F. An Ultra High Speed Test System, IEEE, Design and Test of Computers, vol. 6, No. 1, Feb. 1989, pp. 18-24.*

* cited by examiner

*Primary Examiner*—Russell Frejd
(74) *Attorney, Agent, or Firm*—Birch, Stewart, Kolasch & Birch, LLP

(57) ABSTRACT

A channel emulating device includes a first choosing module, a first signal integrating module, a first parameter adjusting module, a second choosing module, a second signal integrating module, a second parameter adjusting module and a third choosing module. The first signal integrating module generates at least one first integrated signal in accordance with a first input signal and at least one second input signal. The first and the second parameter adjusting modules respectively generate at least one first parameter signal and at least one second parameter signal. The second signal integrating module generates a plurality of second integrated signals in accordance with the first parameter signal and the second parameter signal. One of the second integrated signals acts as a first output signal. The third choosing module receives the second parameter signal and outputs the second parameter signal through a fifth channel or receives the rest of the second integrated signals and outputs the rest of the second integrated signals through a sixth channel to act as at least one second output signal.

25 Claims, 5 Drawing Sheets

CHANNEL EMULATING DEVICE

BACKGROUND OF THE INVENTION

1. Field of Invention

The present invention relates to an emulating device, and more particularly, to a channel emulating device adapted to multiple-input multiple-output (MIMO) transmission systems.

2. Related Art

Accompanying to the progress of the technology, the wireless transmission-technology has been continuously developed and has tightly combined with the daily life. The electronic products such as mobile phones, personal digital assistants (PDAs), personal computers, and the like have brought a more convenient environment. In the age of the mass information flow, the demand on the-wireless transmission gets higher and higher.

A wireless communication system having a higher efficiency and a higher capability are needed in order to enhance the information transmission quality and the signal covering range and to implement the reliable and stable transmission. A MIMO transmission system is one of the wireless communication systems. As shown in FIG. 1, the MIMO wireless transmission system 1 includes m transmitting antennas T1, T2, ..., Tm disposed at a wireless access point 11, and n receiving antennas R1, R2, ..., Rn disposed at a receiver station 12. Thus, a MIMO channel 13 is built in the space, and the transmitting antennas T1, T2, ..., Tm transmit signals to the receiving antennas R1, R2, ..., Rn through the MIMO channel 13 so as to enhance the transmission efficiency and satisfy the requirement by way of antenna diversity, beam forming or spatial multiplex. This system may be expressed as:

$$\begin{pmatrix} x1 \\ x2 \\ x3 \\ \vdots \\ xn \end{pmatrix} = \begin{pmatrix} h11 & h12 & h13 & \cdots & h1m \\ h21 & h22 & h23 & \cdots & h2m \\ h31 & h32 & h33 & \cdots & h3m \\ \vdots & \vdots & \vdots & & \vdots \\ hn1 & hn2 & hn3 & \cdots & hnm \end{pmatrix} \begin{pmatrix} s1 \\ s2 \\ s3 \\ \vdots \\ sm \end{pmatrix} + \begin{pmatrix} v1 \\ v2 \\ v3 \\ \vdots \\ vn \end{pmatrix} \text{ Or } x = Hs + v$$

wherein input signals s1, s2, ..., sm are respectively emitted by the transmitting antennas T1, T2, ..., Tm, output signals x1, x2, ..., xn are respectively received by the receiving antennas R1, R2, ..., Rn, the H matrix denotes an environmental matrix of the MIMO channel 13, and noises v1, v2, ..., vn are received by the receiving antennas R1, R2, ..., Rn.

More and more electronic products using the MIMO technology have become available in the market. Tests have to be performed before the products are mass-produced. The conventional testing method is to implement the portion of the H matrix using a testing system. As shown in FIG. 2, a testing system 2 is disposed between a testing device 3 and a device-under-test 4. The testing device 3 generates m input signals s1, s2, ..., sm. The device-under-test 4 receives n output signals x1, x2, ..., xn. The testing system 2 includes m first power splitters 21, m×n power attenuators/phase shifters 22 and n second power splitters 23. The first power splitters 21 respectively receive the input signals s1, s2, ..., sm generated by the testing device 3 and generate n integrated signals I. The power attenuators/phase shifters 22 respectively receive the integrated signals I, adjusts the power or phase of the integrated signals I, and then generates n parameter signals P. The second power splitters 23 respectively receive the n parameter signals P and output the output signals x1, x2, ..., xn to the device-under-test 4.

In the prior art, the testing system must have m×n power attenuators/phase shifters to emulate various transmission conditions when m input signals and n output signals exist. Consequently, the system will be very huge and complicated, and the manufacturing cost is also high. Thus, it is an important subject to provide a simple and low-cost device for emulating the MIMO transmission system.

SUMMARY OF THE INVENTION

In view of the foregoing, the present invention is to provide a channel emulating device capable of simplifying the system complexity and reducing the cost.

To achieve the above, a channel emulating device according to the present invention is disposed between a testing device (TD) and a device-under-test (DUT). The channel emulating device receives a first input signal and at least one second input signal, which are generated by the testing device, and generating and outputting a first output signal and at least one second output signal to the device-under-test. The channel emulating device includes a first choosing module, a first signal integrating module, a first parameter adjusting module, a second choosing module, a second signal integrating module, a second parameter adjusting module and a third choosing module. The first choosing module has at least one first channel and at least one second channel. The first choosing module receives the second input signal and outputs the second input signal through the first channel or the second channel. The first signal integrating module generates at least one first integrated signal in accordance with the first input signal and the second input signal outputted through the second channel of the first choosing module. The first parameter adjusting module generates at least one first parameter signal in accordance with the first integrated signal. The second parameter adjusting module generates at least one second parameter signal in accordance with the second input signal outputted through the first channel of the first choosing module. The second choosing module has at least one third channel and at least one fourth channel. The second choosing module receives the second parameter signal and outputs the second parameter signal through the third channel or the fourth channel. The second signal integrating module generates a plurality of second integrated signals in accordance with the first parameter signal and the second parameter signal outputted through the fourth channel of the second choosing module. One of the second integrated signals acts as the first output signal. The third choosing module has at least one fifth channel and at least one sixth channel. The third choosing module receives the second parameter signal and outputs the second parameter signal through the fifth channel or receives the rest of the second integrated signals and outputs the rest of the second integrated signals through the sixth channel to act as the second output signal.

As mentioned above, a channel emulating device according to the present invention utilizes the choosing modules, the signal integrating modules and the parameter adjusting modules to produce a plurality of channels and gain parameters between the testing device and the device-under-test, and utilizes the channel choosing function of the choosing module to switch the signal transmission path. Comparing with the prior art, the present invention can decrease the amount of used power attenuators or phase shifters, simplify the system complexity, and reduce the cost.

BRIEF DESCRIPTION OF THE DRAWINGS

The present invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
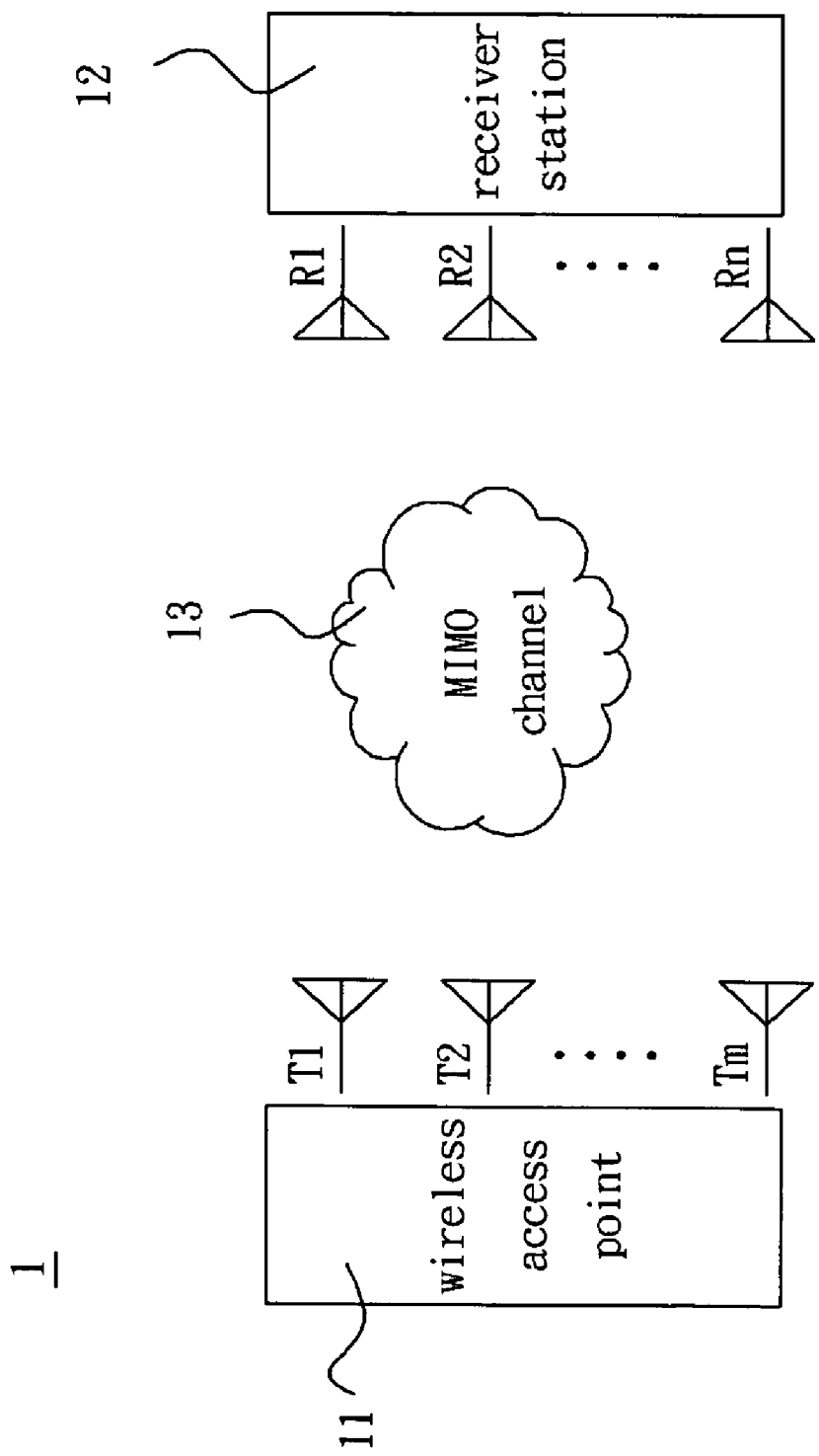
FIG. 1 is a schematic view showing a conventional MIMO wireless transmission system.
Figure 2:
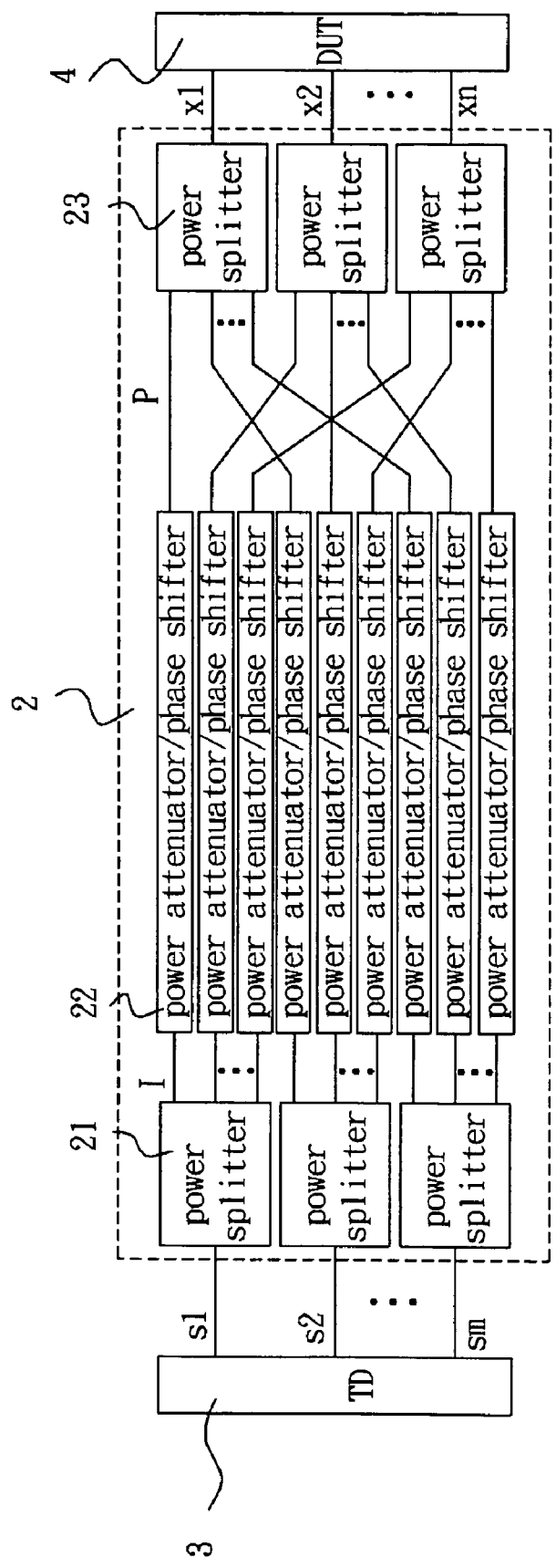
FIG. 2 is a schematic view showing a conventional testing system.
Figure 3:
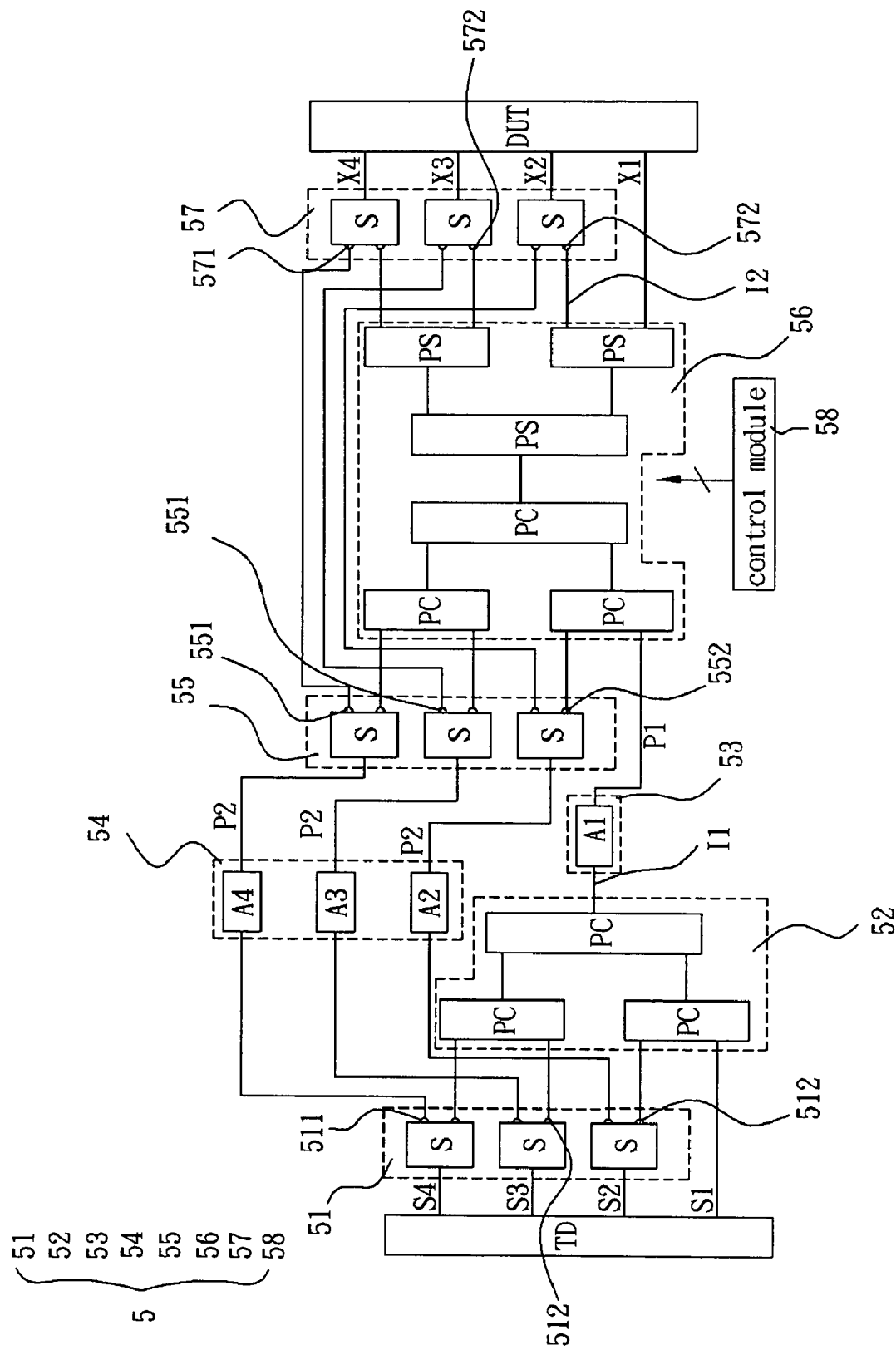
FIG. 3 is a schematic view showing a channel emulating device according to a first embodiment of the present invention.

As shown in FIG. 3, a channel emulating device according to a first embodiment of the present invention emulates such as 4×4 wireless transmission systems.

In this embodiment, the channel emulating device 5 is disposed between a testing device TD and a device-under-test DUT. The testing device TD has a wireless access point (AP)(not shown). The testing device TD generates a first input signal S1 and three second input signals S2, S3 and S4 and transmits the signals S1 to S4 to the channel emulating device 5. The device-under-test DUT has an Ethernet adapter and a computer (not shown). The device-under-test DUT receives a first output signal X1 and three second output signals X2, X3 and X4. The channel emulating device 5 includes a first choosing module 51, a first signal integrating module 52, a first parameter adjusting module 53, a second parameter adjusting module 54, a second choosing module 55, a second signal integrating module 56 and a third choosing module 57.

The first choosing module 51 has three single pole double throws (SPDTs) S. Each SPDT has a first channel 511 and a second channel 512. The first choosing module 51 receives the second input signals S2, S3 and S4 and outputs the second input signals S2, S3 and S4 through the first channel 511 or the second channel 512. The first signal integrating module 52 has three dual-input power combiners PC. The first signal integrating module 52 generates a first integrated signal I1 in accordance with the first input signal S1 and the second input signals S2, S3 and S4 outputted through the second channel 512 of the first choosing module 51.

The first parameter adjusting module 53 has a power attenuator A1 for attenuating the power of the first integrated signal I1, and generates a first parameter signal P1. In another embodiment, the power attenuator A1 may be replaced with a phase shifter for adjusting the phase of the signal.

The second parameter adjusting module 54 has three power attenuators A2, A3 and A4 for respectively attenuating the powers of the second input signals S2, S3 and S4 outputted through the first channel 511 of the first choosing module 51, and generates a plurality of second parameter signals P2. In another embodiment, the channel emulating device 5 may further have an external port, through which one of the power attenuators A2, A3 and A4 is electrically connected with the first choosing module 51 and the second choosing module 55. The power attenuators A2, A3 and A4 may also be replaced with phase shifters for adjusting the phase of the signal.

The second choosing module 55 has three SPDTs S. Each SPDT has a third channel 551 and a fourth channel 552. The second choosing module 55 receives the second parameter signals P2 and outputs the second parameter signals P2 through the third channel 551 or the fourth channel 552.

The second signal integrating module 56 has three dual-input power combiners PC and three dual-output power splitters PS. The second signal integrating module 56 generates a plurality of second integrated signals I2 and the first output signal X1 in accordance with the first parameter signal P1 and the second parameter signals P2 outputted through the fourth channel 552 of the second choosing module 55.

The third choosing module 57 has three SPDTs S. Each SPDT has a fifth channel 571 and a sixth channel 572. The third choosing module 57 receives the second parameter signals P2 and outputs the second parameter signals P2 through the fifth channel 571 or receives the rest of the second integrated signals I2 and outputs the rest of the second integrated signals I2 through the sixth channel 572 to act as the second output signals X2, X3 and X4.

In this embodiment, the channel emulating device 5 may further include a control module 58 for controlling the first choosing module 51, the second choosing module 55 and the third choosing module 57 to switch the channels, and controlling the first signal integrating module 52 and the second signal integrating module 56 to combine and split the signals. In addition, the first choosing module 51, the first signal integrating module 52, the first parameter adjusting module 53, the second parameter adjusting module 54, the second choosing module 55, the second signal integrating module 56 and the third choosing module 57 may be programmable or manual control.

The emulated conditions according to the first embodiment of the present invention will be described herein below. The testing device TD generates the first input signal S1 and the second input signals S2, S3 and S4.

The first emulated condition is that the first choosing module 51, the second choosing module 55 and the third choosing module 57 are respectively switched to the first channel 511, the third channel 551 and the sixth channel 572. The transmission path of the signal in the channel emulating device 5 will be described with reference to the example of the first input signal S1 and the second input signal S2.

First, the first signal integrating module 52 receives the first input signal S1. Because the first signal integrating module 52 is electrically connected with the second channel 512 of the first choosing module 51 and the first choosing module 51 is switched to the first channel 511, the second input signals S2, S3 and S4 cannot be outputted to the first signal integrating module 52 through the second channel 512. The first signal integrating module 52 generates the first integrated signal I1 in accordance with the first input signal S1 and outputs the first integrated signal I1 to the power attenuator A1. The power attenuator A1 attenuates the power of the signal and then generates the first parameter signal P1 and outputs the first parameter signal P1 to the second signal integrating module 56. The second signal integrating module 56 splits the power of the first parameter signal P1 and generates three second integrated signals I2 and the first output signal X1. The first output signal X1 is received by the device-under-test DUT. The second integrated signals I2 are outputted to the third choosing module 57. Because the third choosing module 57 is switched to the sixth channel 572, the third choosing module 57 receives the second integrated signals I2 through the sixth channel 572 and then outputs the second integrated signals I2, which act as the second output signals X2, X3 and X4, to the device-under-test DUT.

The second input signal S2 is firstly transmitted to the first choosing module 51. Because the first choosing module 51 is switched to the first channel 511, the second input signal S2 is outputted to the power attenuator A2 of the second parameter adjusting module 54 through the first channel 511. The power attenuator A2 attenuates the power of the second input signal S2, generates the second parameter signal P2 and then outputs the second parameter signal P2 to the second choosing module 55. Because the second choosing module 55 is switched to the third channel 551, the second parameter signal P2 is outputted to the fifth channel 571 of the third choosing module 57 through the third channel 551. Because the third choosing module 57 is switched to the sixth channel 572, the second parameter signal P2 cannot be outputted through the fifth channel 571. Thus, the device-under-test DUT cannot receive the second parameter signal P2.

The principle of transmitting the second input signal S2 is adapted to the method of transmitting the second input signal S3 and S4. Thus, in the first emulated condition, the testing signal includes the first input signal S1, and the signal-under-test includes the first output signal X1 and the second output signals X2, X3 and X4. The first emulated condition may be expressed as:

$$\begin{bmatrix} X1 \\ X2 \\ X3 \\ X4 \end{bmatrix} = \begin{bmatrix} h11 & 0 & 0 & 0 \\ h11 & 0 & 0 & 0 \\ h11 & 0 & 0 & 0 \\ h11 & 0 & 0 & 0 \end{bmatrix} \begin{bmatrix} S1 \\ S2 \\ S3 \\ S4 \end{bmatrix} + \begin{bmatrix} v1 \\ v2 \\ v3 \\ v4 \end{bmatrix}$$

wherein h11 denotes the gain obtained after the signal passes through the power attenuator A1, and v1, v2, v3 and v4 denote the noises.

The second emulated condition is that the first choosing module 51, the second choosing module 55 and the third choosing module 57 are respectively switched to the second channel 512, the third channel 551 and the sixth channel 572. The transmission path of the first input signal S1 and the second input signals S2, S3 and S4 in the channel emulating device 5 will be described herein below.

First, the first signal integrating module 52 receives the first input signal S1. Because the first signal integrating module 52 is electrically connected with the second channel 512 of the first choosing module S1 and the first choosing module S1 is switched to the second channel 512, the second input signals S2, S3 and S4 are outputted to the first signal integrating module 52 through the second channel 512. The first signal integrating module 52 combines the power of the first input signal S1 and the second input signals S2, S3 and S4, generates the first integrated signal I1, and outputs the first integrated signal I1 to the power attenuator A1. The power attenuator A1 attenuates the power of the signal and then generates the first parameter signal P1 and outputs the first parameter signal P1 to the second signal integrating module, 56. The second signal integrating module 56 splits the power of the first parameter signal P1 and generates three second integrated signals I2 and the first output signal X1. The first output signal X1 is received by the device-under-test DUT. The second integrated signals I2 are outputted to the third choosing module 57. Because the third choosing module 57 is switched to the sixth channel 572, the third choosing module 57 receives the second integrated signals I2 through the sixth channel 572 and then outputs the second integrated signals I2, which act as the second output signals X2, X3 and X4, to the device-under-test DUT.

Thus, in the second emulated condition, the testing signal includes the first input signal S1 and the second input signals S2, S3 and S4, and the signal-under-test includes the first output signal X1 and the second output signals X2, X3 and X4. The second emulated condition may be expressed as:

$$\begin{bmatrix} X1 \\ X2 \\ X3 \\ X4 \end{bmatrix} = \begin{bmatrix} h11 & h11 & h11 & h11 \\ h11 & h11 & h11 & h11 \\ h11 & h11 & h11 & h11 \\ h11 & h11 & h11 & h11 \end{bmatrix} \begin{bmatrix} S1 \\ S2 \\ S3 \\ S4 \end{bmatrix} + \begin{bmatrix} v1 \\ v2 \\ v3 \\ v4 \end{bmatrix}.$$

The third emulated condition is that the first choosing module 51, the second choosing module 55 and the third choosing module 57 are respectively switched to the first channel 511, the fourth channel 552 and the sixth channel 572. In accordance with the principle of signal transmission adapted in the first and the second emulated conditions, the testing signal includes the first input signal S1 and the second input signals S2, S3 and S4, and the signal-under-test includes the first output signal X1 and the second output signals X2, X3 and X4 in this emulated condition. The third emulated condition may be expressed as:

$$\begin{bmatrix} X1 \\ X2 \\ X3 \\ X4 \end{bmatrix} = \begin{bmatrix} h11 & h22 & h33 & h44 \\ h11 & h22 & h33 & h44 \\ h11 & h22 & h33 & h44 \\ h11 & h22 & h33 & h44 \end{bmatrix} \begin{bmatrix} S1 \\ S2 \\ S3 \\ S4 \end{bmatrix} + \begin{bmatrix} v1 \\ v2 \\ v3 \\ v4 \end{bmatrix}$$

wherein h22, h33 and h44 respectively denote the gain obtained after the signal passes through the power attenuators A2, A3 and A4.

The fourth emulated condition is that the first choosing module 51, the second choosing module 55 and the third choosing module 57 are respectively switched to the first channel 511, the third channel 551 and the fifth channel 571. In accordance with the principle of signal transmission adapted in the first and the second emulated conditions, the testing signal includes the first input signal S1 and the second input signals S2, S3 and S4, and the signal-under-test includes the first output signal X1 and the second output signals X2, X3 and X4 in this emulated condition. The fourth emulated condition may be expressed as:

$$\begin{bmatrix} X1 \\ X2 \\ X3 \\ X4 \end{bmatrix} = \begin{bmatrix} h11 & 0 & 0 & 0 \\ 0 & h22 & 0 & 0 \\ 0 & 0 & h33 & 0 \\ 0 & 0 & 0 & h44 \end{bmatrix} \begin{bmatrix} S1 \\ S2 \\ S3 \\ S4 \end{bmatrix} + \begin{bmatrix} v1 \\ v2 \\ v3 \\ v4 \end{bmatrix}.$$

Figure 4:
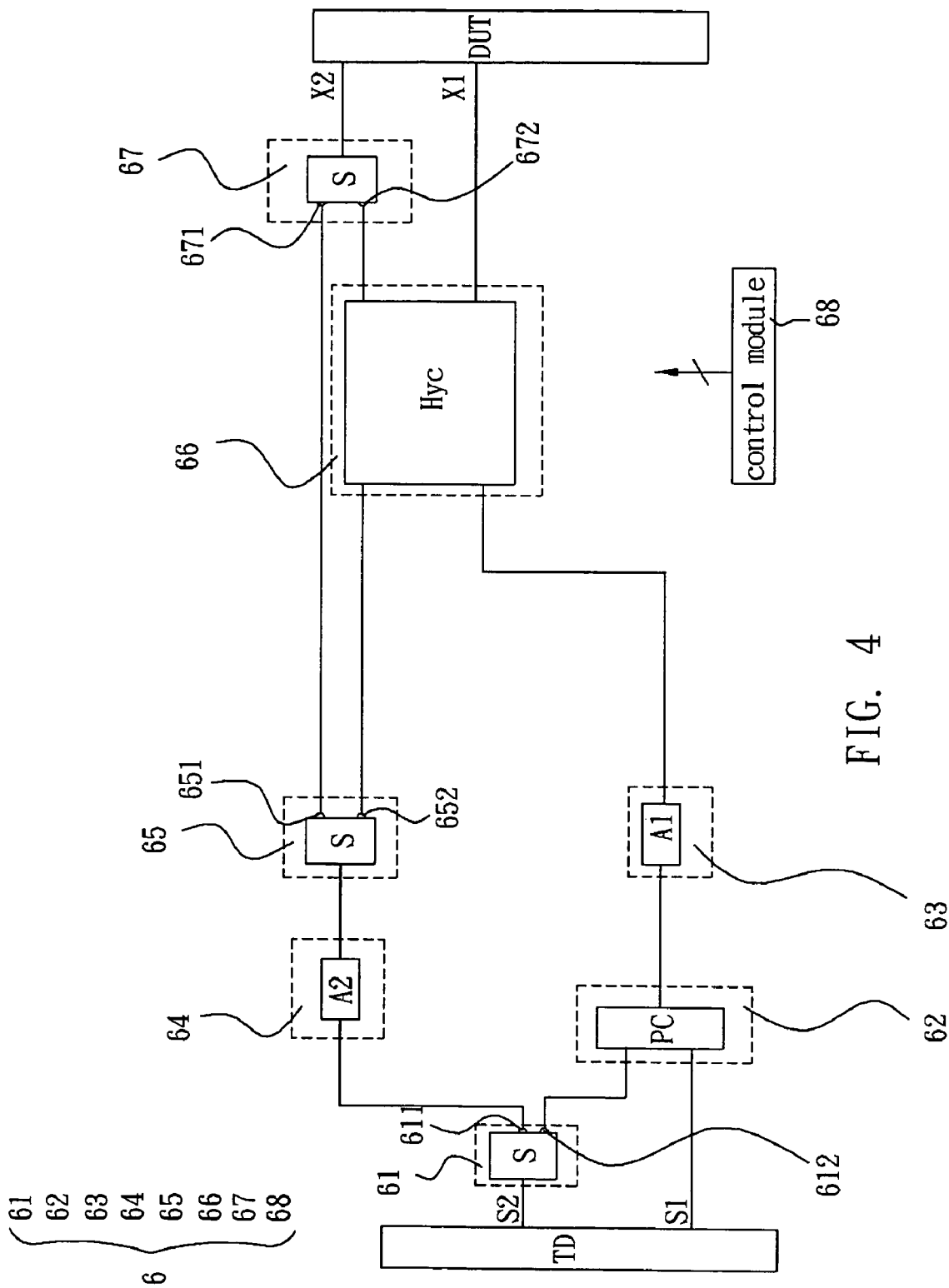
FIG. 4 is a schematic view showing a channel emulating device according to a second embodiment of the present invention.

As shown in FIG. 4, a channel emulating device according to a second embodiment of the present invention emulates such as 2×2 wireless transmission systems.

In this embodiment, the channel emulating device 6 is disposed between a testing device TD and a device-under-test DUT. The testing device TD generates a first input signal S1 and a second input signal S2 and transmits the signals S1 and S2 to the channel emulating device 6. The device-under-test DUT receives a first output signal X1 and a second output signal X2. The channel emulating device 6 includes a first choosing module 61, a first signal integrating module 62, a first parameter adjusting module 63, a second parameter adjusting module 64, a second choosing module 65, a second signal integrating module 66, a third choosing module 67 and a control module 68. The connections, properties and functions of the above-mentioned modules are the same as those of the first embodiment, and detailed descriptions thereof will be omitted. In this embodiment, the first choosing module 61 has a SPDT S. The first signal integrating module 62 has a dual-input power combiner PC. The first parameter adjusting module 63 has a power attenuator A1. The second parameter adjusting module 64 has a power attenuator A2. The second choosing module 65 has a SPDT S. The second signal integrating module 66 has a hybrid coupler Hyc. The third choosing module 67 has a SPDT S.

Figure 5:
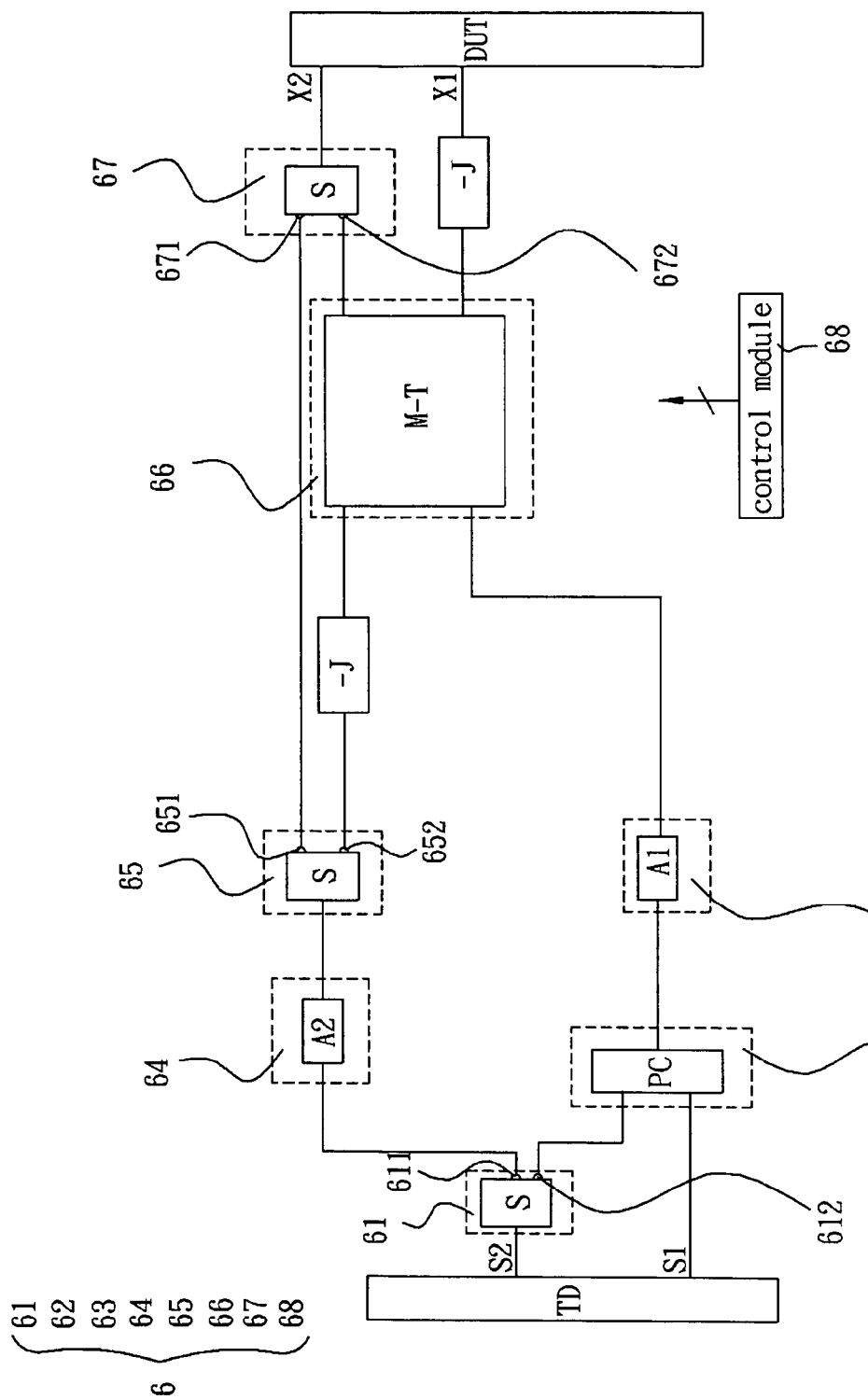
FIG. 5 is another schematic view showing a channel emulating device according to the second embodiment of the present invention.

As shown in FIG. 5, another aspect of the second embodiment is similar to the above-mentioned aspect of the second embodiment in the connections, properties and functions except that the hybrid coupler Hyc of the second signal integrating module 66 is replaced with a Magic-Tee coupler M-T, and two 90-degree phase shifters -J are respectively disposed between the device-under-test DUT and the second signal integrating module 66 and between the second choosing module 65 and the second signal integrating module 66. So, detailed descriptions of this aspect will be omitted. In addition, the hybrid coupler Hyc and the Magic-Tee coupler M-T are frequently used in the industry, and the principles thereof will be omitted.

Four emulated conditions according to the second embodiment of the present invention will be described herein below, and the different aspects of the second embodiment are adapted to the four emulated conditions.

The first emulated condition is that the first choosing module 61, the second choosing module 65 and the third choosing module 67 are respectively switched to a first channel 611, a third channel 651 and a sixth channel 672. The first emulated condition may be represented as:

$$X1=(h11\angle\Phi1)\times S1/\sqrt{2}+v1$$

$$X2=(h11\angle\Phi1-90°)\times S1/\sqrt{2}+v2$$

wherein $\Phi1$ denotes the phase of the first output signal X1.

The second emulated condition is that the first choosing module 61, the second choosing module 65 and the third choosing module 67 are respectively switched to a second channel 612, the third channel 651 and the sixth channel 672. The second emulated condition may be represented as:

$$X1=(h11\angle\Phi1)\times S1/\sqrt{2}+(h11\angle\Phi2)\times S2/\sqrt{2}+v1$$

$$X2=(h11\angle\Phi1-90°)\times S1/\sqrt{2}+(h11\angle\Phi2-90°)\times S2/\sqrt{2}+v2$$

wherein $\Phi2$ denotes the phase of the second output signal X2.

The third emulated condition is that the first choosing module 61, the second choosing module 65 and the third choosing module 67 are respectively switched to the first channel 611, a fourth channel 652 and the sixth channel 672. The third emulated condition may be represented as:

$$X1=(h11\angle\Phi1)\times S1/\sqrt{2}+(h22\angle\Phi2-90°)\times S2/\sqrt{2}+v1$$

$$X2=(h11\angle\Phi1-90°)\times S1/\sqrt{2}+(h22\angle\Phi2)\times S2/\sqrt{2}+v2$$

The fourth emulated condition is that the first choosing module 61, the second choosing module 65 and the third choosing module 67 are respectively switched to the first channel 611, the third channel 651 and a fifth channel 671. The fourth emulated condition may be represented as:

$$X1=(h11\angle\Phi1)\times S1/\sqrt{2}+v1$$

$$X2=(h22\angle\Phi2)\times S2+v2$$

In summary, a channel emulating device according to the present invention utilizes the choosing modules, the signal integrating modules and the parameter adjusting modules to produce a plurality of channels and gain parameters between the testing device and the device-under-test, and utilizes the channel choosing function of the choosing module to switch the signal transmission path. Comparing with the prior art, the present invention can decrease the amount of used power attenuators or phase shifters, simplify the system complexity, and reduce the cost. In addition, the channel emulating device of the present invention further includes the external port such that the amount of power attenuators or phase shifters can be increased in accordance with the practical requirement.

While the present invention has been described by way of example and in terms of a preferred embodiment, it is to be understood that the present invention is not limited thereto. To the contrary, it is intended to cover various modifications. Therefore, the scope of the appended claims should be accorded the broadest interpretation so as to encompass all such modifications.

What is claimed is:

1. A channel emulating device disposed between a testing device and a device-under-test, the channel emulating device receiving a first input signal and at least one second input signal, which are generated by the testing device, and generating and outputting a first output signal and at least one second output signal to the device-under-test, the channel emulating device comprising:

a first choosing module having at least one first channel and at least one second channel, the first choosing module receiving the second input signal and outputting the second input signal through the first channel or the second channel;

a first signal integrating module generating at least one first integrated signal in accordance with the first input signal and the second input signal outputted through the second channel of the first choosing module;

a first parameter adjusting module generating at least one first parameter signal in accordance with the first integrated signal;

a second parameter adjusting module generating at least one second parameter signal in accordance with the second input signal outputted through the first channel of the first choosing module;

a second choosing module having at least one third channel and at least one fourth channel, the second choosing module receiving the second parameter signal and outputting the second parameter signal through the third channel or the fourth channel;

a second signal integrating module generating a plurality of second integrated signals in accordance with the first parameter signal and the second parameter signal, and one of the plurality of second integrated signals acts as the first output signal; and a third choosing module having at least one fifth channel and at least one sixth channel, the third choosing module receiving the second parameter signal and outputting the second parameter signal through the fifth channel or receiving the rest of the plurality of second integrated signals and outputting the rest of the plurality of second integrated signals through the sixth channel to act as the second output signal.

2. The device according to claim 1, wherein the first choosing module, the second choosing module or the third choosing module is controlled by a program or is controlled manually.

3. The device according to claim 2, wherein the first choosing module has at least one Single Pole Double Throw having the first channel and the second channel.

4. The device according to claim 2, wherein the second choosing module has at least one Single Pole Double Throw having the third channel and the fourth channel.

5. The device according to claim 2, wherein the third choosing module has at least one Single Pole Double Throw having the fifth channel and the sixth channel.

6. The device according to claim 1, wherein the first signal integrating module and the second signal integrating module respectively have at least one power splitter and/or at least one power combiner.

7. The device according to claim 6, wherein the power splitter is a dual-output power splitter.

8. The device according to claim 6, wherein the power combiner is a dual-input power combiner.

9. The device according to claim 1, wherein the first parameter adjusting module has at least one power attenuator and/or at least one phase shifter.

10. The device according to claim 9, wherein the power attenuator is controlled by a program or is controlled manually.

11. The device according to claim 9, wherein the phase shifter is controlled by a program or is controlled manually.

12. The device according to claim 9, wherein the power attenuator is for attenuating the power of the first integrated signal.

13. The device according to claim 9, wherein the phase shifter is for adjusting the phase of the first integrated signal.

14. The device according to claim 1, wherein the second parameter adjusting module has at least one power attenuator and/or at least one phase shifter.

15. The device according to claim 14, wherein the power attenuator is controlled by a program or is controlled manually.

16. The device according to claim 14, wherein the phase shifter is controlled by a program or is controlled manually.

17. The device according to claim 14, wherein the power attenuator is for attenuating the power of the second input signal.

18. The device according to claim 14, wherein the phase shifter is for adjusting the phase of the second input signal.

19. The device according to claim 1, further comprises at least one external port, through which the second parameter adjusting module is electrically connected with the first choosing module and the second choosing module.

20. The device according to claim 1, wherein the device-under-test has an Ethernet adapter and a computer.

21. The device according to claim 1, wherein the testing device has a wireless access point.

22. The device according to claim 1, further comprises at least one 90-degree phase shifter disposed between the testing device and the device-under-test.

23. The device according to claim 22, wherein the 90-degree phase shifter is disposed between the device-under-test and the second signal integrating module and/or between the second choosing module and the second signal integrating module.

24. The device according to claim 1, further comprising:
a control module controlling the first choosing module, the second choosing module, the third choosing module, the first signal integrating module and the second signal integrating module.

25. The device according to claim 1, wherein the second signal integrating module has a hybrid coupler or a Magic-Tee coupler.

* * * * *